United States Patent [19]
Willenberg et al.

[11] Patent Number: 5,968,288
[45] Date of Patent: *Oct. 19, 1999

[54] METHOD FOR THE PREPARATION OF A SOLDERING FLUX

[75] Inventors: Heinrich Willenberg, Kleve; Wilfried Becher, deceased, late of Bad Wimpfen, by Monika Becher, legal rep.; Karl-Heinz Hellberg, Bad Wimpfen, all of Germany

[73] Assignee: Solvay Fluor und Derivate GmbH, Hannover, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/658,179

[22] Filed: Jun. 4, 1996

[30] Foreign Application Priority Data

Jun. 7, 1995 [DE] Germany ............................ 195 20 812

[51] Int. Cl.$^6$ .................................................. B23K 35/362
[52] U.S. Cl. ................................. 148/26; 148/23; 148/24; 423/116; 423/464; 423/465
[58] Field of Search ................................. 148/23, 24, 26; 423/116, 464, 465

[56] References Cited

U.S. PATENT DOCUMENTS 4,428,920  1/1984  Willenburg et al. ..................... 423/465
4,579,605  4/1986  Kawase et al. ............................ 148/26
4,888,067  12/1989  Sato et al. ................................ 148/26

FOREIGN PATENT DOCUMENTS 063750  11/1982  European Pat. Off. .
597652  5/1994  European Pat. Off. .

OTHER PUBLICATIONS

Abstract of Published Japanese Patent Application No. JP 53–05480. Nov. 19, 1993.

*Primary Examiner*—Patrick Ryan
*Assistant Examiner*—M. Alexander Elve
*Attorney, Agent, or Firm*—Evenson, McKeown, Edwards & Lenahan, P.L.L.C.

[57] ABSTRACT

A method for the preparation of potassium salts of complex aluminum fluorides which can be used in particular as a flux in particular for soldering lightweight metallic materials. In the method a potassium compound is added to aqueous fluoroaluminic acid, and potassium cryolite or a substance mixture which contains potassium cryolite is added to the resulting suspension. The resulting product is then dried and can be used as a flux for soldering lightweight metallic materials, especially aluminum.

12 Claims, No Drawings

METHOD FOR THE PREPARATION OF A SOLDERING FLUX

BACKGROUND OF THE INVENTION

The present invention relates to a method for the preparation of a composition which contains potassium salts of complex fluorides of aluminum and which is suitable as a flux for soldering lightweight metallic materials such as aluminum. A further aspect of the invention relates to a reaction mixture which can be used to produce such a flux.

In hard soldering or furnace soldering, metallic materials, particularly aluminum, are joined at a temperature above 500° C. with the aid of a molten auxiliary metal (solder). The melting temperature of the solder is lower than the melting temperature of the materials, so they can often be separated without destroying them by re-melting the solder.

During soldering, oxides and other interfering cover layers on the metal surface are a problem: the surface must be metallically pure, so that a satisfactory soldered joint is produced. For this purpose, fluxes are used, which are usually brushed or sprayed on or are applied to the material as a coating.

Fluxes composed of potassium salts of complex aluminum fluorides are particularly suitable as fluxes.

U.S. Pat. No. 4,428,920 (=EP 063,750) describes a method for preparing a flux of this type. According to that method, a potassium compound, preferably potassium hydroxide in the form of a potassium lye solution, is added to fluoroaluminic acid in a precipitation stage whereupon potassium salts of complex fluorides of aluminum are precipitated. Then the water content of the suspension of potassium salts of complex fluorides of aluminum produced in this precipitation stage is separated, and the resulting solids are dried at 120° C. In this method, a flux is obtained which melts without residue below 575° C.

In that method, advantageously freshly prepared fluoroaluminic acid (obtainable from aluminum hydroxide and hydrofluoric acid) is used. The potassium compound is used in a stoichiometric shortage; this means that fluoroaluminic acid is still present in the aqueous supernatant of the resulting complex aluminum fluoride.

SUMMARY OF THE INVENTION

It is an object of the present invention to provide a method of preparing a mixture of potassium salts of complex aluminum fluorides in which the starting materials are better utilized.

Another object of the invention is to provide a method of preparing a mixture of potassium salts of complex aluminum fluorides which produces a product having constant properties particularly with respect to use as a soldering flux.

These and other objects are achieved in accordance with the present invention by providing a method for the preparation of a mixture of potassium salts of complex aluminum fluorides which can be used as a soldering flux, the mixture comprising a mixture of potassium tetrafluoroaluminate and dipotassium pentafluoroaluminate or the hydrate thereof, and the method comprising adding an aqueous solution of a potassium compound to aqueous fluoroaluminic acid in a precipitation stage to produce a suspension, adding potassium cryolite or a mixture which contains potassium cryolite to the suspension produced in the precipitation stage, separating the resulting solid from an aqueous phase, and drying the separated solid.

DETAILED DESCRIPTION OF PREFERRED EMBODIMENTS

The method according to the invention for the preparation of a mixture of potassium salts of complex aluminum fluorides which can be used as a soldering flux, which mixture contains potassium tetrafluoroaluminate and dipotassium pentafluoroaluminate or the hydrate thereof, provides for aqueous fluoroaluminic acid to be reacted in a precipitation stage with an aqueous solution of a potassium compound, for potassium cryolite or a mixture which contains potassium cryolite to be added to the suspension produced in the precipitation stage, for the resulting solid to be separated from the aqueous phase, and for the separated solid to be dried.

The fluoroaluminic acid is advantageously freshly prepared from aluminum hydroxide and hydrofluoric acid. The hydrofluoric acid may contain a greater or lesser concentration of hydrogen fluoride, for instance up to 60% by weight. Advantageously, hydrofluoric acid having a concentration of 5 to 30% by weight hydrogen fluoride is used. The fluoroaluminic acid obtainable according to this may contain an excess of fluoride. The ratio of fluorine to aluminum is preferably in the range from 4.0:1 to 5:1, particularly preferably in the range from 4.0:1 to 4.4:1.

Potassium compounds which upon reaction with fluoroaluminic acid result in a precipitation of potassium salts of complex fluorides of aluminum are used. Basic potassium compounds, the anions of which upon reaction can be separated in dissolved or gaseous form from the suspension produced in the precipitation stage, such as potassium hydroxide or potassium carbonate, are particularly advantageous. The molar ratio of K:Al preferably is set to less than 1:1 in reacting fluoroaluminic acid and the potassium compound. Preferably, potassium hydroxide is used, and particularly preferably in the form of a potassium hydroxide solution containing a concentration of from 2 to 25% by weight KOH. It is possible, even if not preferred, to replace a portion of the basic potassium compound (for instance a portion of the potassium hydroxide) with other potassium compounds such as potassium chloride; for instance, up to one quarter of the potassium hydroxide can be used in the form of potassium chloride or other potassium compounds.

The invention will be described in further detail hereinafter with reference to an illustrative preferred embodiment, namely the use of potassium hydroxide as potassium compound, but it should be understood that the invention is not restricted to the use of potassium hydroxide.

The reaction in the precipitation stage, i.e. upon the reaction between fluoroaluminic acid and potassium hydroxide, may take place at a temperature in the range from room temperature up to the boiling point of the reaction mixture. Temperatures in the range of 70° C. to 90° C. are preferred. The temperature upon addition of the potassium cryolite is advantageously up to the boiling point, e.g. between 70° C. and the boiling point, preferably in the range from 70° C. to 90° C.

Pure $K_3AlF_6$ may be used as potassium cryolite. Industrial products which contain this compound only in part (for instance 50% by weight or more) can also be used. Other constituents of such compositions referred to industrially as "cryolites" are dipotassium pentafluoroaluminate and hydrates thereof, optionally also aluminum fluoride or hydrates thereof, or potassium fluoride and other contaminants resulting from the production process. One product referred to as "cryolite" which can be used in the method according to the invention for instance has the formula $K_{2.8}AlF_{5.8}$. The cryolite is preferably used in finely powdered form.

Once the precipitation stage has been completed, a subsequent reaction phase can be carried out. For this purpose, the reaction mixture can advantageously be stirred. The time is advantageously 0.2 to 1 hour. The temperature during the subsequent reaction phase is preferably in the range from 70° C. up to the boiling point of the reaction mixture.

After the addition of the cryolite, a subsequent reaction phase can be carried out. The time is advantageously in the range from 1 to 6 hours, and the temperature is advantageously in the range from 70° C. up to the boiling point of the reaction mixture.

Explanations of the molar ratio of potassium to aluminum to fluorine will be given below, with respect to the corresponding ratio of the starting products in the precipitation stage, with respect to the corresponding ratio of the total formulation (i.e. taking into account the starting material in the precipitation stage plus the potassium cryolite used) and with respect to the corresponding molar ratio in the resulting products.

The quantities of starting materials (fluoroaluminic acid/potassium compound) in the precipitation stage are preferably selected such that a molar ratio of potassium to aluminum to fluorine in the range of 0.60–0.95:1:4–4.8 is maintained. A molar ratio of 0.80–0.90:1:4–4.4 is preferred.

With respect to the molar ratio in the total formulation, i.e. including the addition of potassium cryolite or corresponding mixtures containing potassium cryolite, the molar ratio of potassium to aluminum to fluorine is preferably 1.0–2:1:4–5, in particular 1.1–1.2:1:4.4–4.8.

If the method according to the invention is performed as described above, then after the addition of the cryolite, separation of the water present and drying or subjecting the product to a temperature treatment, a mixture of potassium salts of complex fluorides is obtained which can be used very effectively as soldering flux and which has a molar ratio of potassium to aluminum to fluorine lying in the range of 1.1–1.3:1:4.1–4.3. It has been found that the product substantially consists of potassium tetrafluoroaluminate and dipotassium pentafluoroaluminate or the hydrate thereof. Cryolite is detected at most in small quantities.

The flux properties of the material can be improved still further if, as described in co-pending U.S. patent application of Belt et al., Ser. No. 08/590,636, filed Jan. 24, 1996, the disclosure of which is incorporated herein by reference, the hydrate of dipotassium pentafluoroaluminate or dipotassium pentafluoroaluminate which upon drying is merely reversibly dehydrated, is converted into irreversibly dehydrated dipotassium pentafluoroaluminate. This is achieved as described in that patent application by optionally pre-drying the mixture of potassium salts of complex aluminum fluorides and then subjecting the mixture to temperature treatment without sintering or melting the product. Advantageously, the term "temperature treatment" means that the mixture is heated to a temperature above 228° C., preferably above 265° C. until the desired degree of irreversible dehydration is obtained. Such a product results in a still better flow behavior of the solder on the surface of metallic materials.

If desired, metallic additives can also be admixed with the mixture obtained in the method according to the invention, provided that it is to be used as a soldering flux, as is described in U.S. Pat. Nos. 5,100,048 and 5,190,596, the disclosures of which are each incorporated herein by reference. A metal such as silicon, copper or germanium may be admixed, preferably in the form of small particles, such as particles having a size of less than 1,000 $\mu$m, preferably in the range from 4 to 80 $\mu$m. The finished flux then contains the metal component in a quantity of approximately 9 to 85% by weight.

The invention also relates to a novel reaction mixture which, after it has been worked up, provides the desired mixture of potassium salts of complex aluminum fluorides, which is suitable as a flux for soldering lightweight metallic materials. This novel reaction mixture comprises fluoroaluminic acid, potassium salts of complex fluorides of aluminum and also potassium cryolite. It is obtainable by adding potassium cryolite in the precipitation stage.

The mixture of potassium salts of complex aluminum fluorides produced by the method of the invention is particularly suitable for use as a flux for soldering lightweight metallic materials, since it has a melting point below 575° C. However, it can also be used for other applications in which experience has shown that compounds of this type are useful, for instance as a filler, in glass production or for abrasives.

The following examples are intended to illustrate the invention in further detail without limiting its scope.

EXAMPLE 1

614 kg of hydrogen fluoride in the form of a hydrofluoric acid containing 20 by weight hydrogen fluoride and 550 kg of aluminum hydroxide (99% pure) were reacted to form fluoroaluminic acid. At a temperature of 80° C., a potassium hydroxide solution containing 150 by weight KOH, which had been obtained by dissolving 400 kg KOH (90% pure), was introduced into the resulting reaction mixture. A suspension of precipitating potassium salts of complex aluminum fluorides was produced. 270 kg of a commercially available "cryolite" of the "formula" $K_{2.8}AlF_{5.8}$ was introduced into the reaction mixture which had been obtained in the precipitation stage described above.

The product which resulted from this process contained $KAlF_4$ and $K_2AlF_5$, and had a melting point of 570° C., and is outstandingly usable as a soldering flux.

EXAMPLE 2

Production of a flux with temperature treatment for forming irreversibly dehydrated dipotassium pentafluoroaluminate.

Example 1 was repeated. The product obtained after the addition of cryolite was introduced in filter-moist state into a pneumatic-conveyor dryer (flash dryer). The inlet temperature in the dryer was about 570° C., and the residence time was about half a second.

The resulting product was investigated by X-ray diffraction analysis. It was found that it contained irreversibly dehydrated dipotassium pentafluoroaluminate in addition to a predominant amount of potassium tetrafluoroaluminate. The melting point of this product was about 570° C. When this product was used in the form of an aqueous suspension, very even coating of the workpiece resulted, and the solder had even better flow behavior than with the flux of Example 1.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A method for the preparation of a mixture of potassium salts of complex aluminum fluorides essentially free of hexafluoroaluminate which can be used as a soldering flux, said mixture comprising a mixture of potassium tetrafluoroaluminate and dipotassium pentafluoroaluminate or the hydrate thereof, said method comprising adding an aqueous solution of a potassium compound to aqueous fluoroaluminic acid in a precipitation stage to produce a suspension, adding potassium cryolite or a mixture which contains potassium cryolite to the suspension produced in the precipitation stage, separating the resulting solid from an aqueous phase, and drying the separated solid.

2. A method according to claim 1, wherein the suspension produced in the precipitation stage contains a molar ratio of potassium to aluminum of less than 1:1.

3. A method according to claim 1, wherein potassium cryolite or a mixture containing potassium cryolite is added to the suspension produced in the precipitation stage in such a quantity that the mixture contains a molar ratio of potassium to aluminum in the range from 1:1 to 2:1.

4. A method according to claim 1, wherein the fluoroaluminic acid contains a molar ratio of fluorine to aluminum in the range from 4:1 to 5:1.

5. A method according to claim 1, wherein the precipitation stage is maintained at a temperature up to the boiling point of the reaction mixture, and the addition of potassium cryolite or a mixture containing potassium cryolite is effected at a temperature in the range from 70° C. up to the boiling point of the reaction mixture.

6. A method according to claim 5, wherein the precipitation stage is maintained at a temperature in the range from 70 to 90° C.

7. A method according to claim 1, further comprising subjecting the separated solid to a high-temperature treatment such that at least part of the complex aluminum fluorides is converted into irreversibly dehydrated dipotassium pentafluoroaluminate.

8. A method according to claim 1, wherein said potassium compound comprises a potassium hydroxide solution.

9. A method according to claim 1, wherein the cryolite is used in finely powdered form.

10. A reaction mixture for use in the method according to claim 1, comprising fluoroaluminic acid, potassium salts of complex fluorides of aluminum, and potassium cryolite.

11. A method for the preparation of a mixture of potassium salts of complex aluminum fluorides essentially free of hexafluoroaluminate which can be used as a soldering flux, said mixture consisting essentially of a mixture of potassium tetrafluoroaluminate and dipotassium pentafluoroaluminate or the hydrate thereof, said method comprising adding an aqueous solution of a potassium compound to aqueous fluoroaluminic acid in a precipitation stage to produce a suspension, adding potassium cryolite or a mixture which contains potassium cryolite to the suspension produced in the precipitation stage, separating the resulting solid from an aqueous phase, and drying the separated solid.

12. A method for the preparation of a mixture of potassium salts of complex aluminum fluorides essentially free of hexafluoroaluminate which can be used as a soldering flux, said mixture comprising a mixture of potassium tetrafluoroaluminate and dipotassium pentafluoroaluminate or the hydrate thereof, said method comprising adding an aqueous solution of a potassium compound to aqueous fluoroaluminic acid in a precipitation stage to produce a suspension, adding potassium cryolite or a mixture which contains potassium cryolite to the suspension produced in the precipitation stage, separating the resulting solid from an aqueous phase, and drying the separated solid, whereby said mixture is free of cryolite.

* * * * *